United States Patent Office 3,426,324
Patented Feb. 4, 1969

3,426,324
AUTOMATIC SIGNAL READER USING COLOR
SEPARATION
Ron Manly, P.O. Box 201, Hawthorne, Calif. 90250
Filed Apr. 24, 1963, Ser. No. 275,350
U.S. Cl. 340—146.3                          10 Claims
Int. Cl. G06k 9/00, 9/02

This invention relates generally to the detecting and interpreting of information marks, indicators, or recordings, and more particularly to a system and method of detecting and interpreting one or more species of signals on channels of information of such marks, indicators, or recordings, whether in visual, magnetic, electrostatic, or other form which may be distinguishable, and thereby represent intelligence by virtue of their color, modulation, shape, spatial disposition or orientation as within a matrix of possible such positions, or any other characteristic with distinguishable states which may be controlled during application.

The present invention finds particularly useful application in automatic editing systems and, for purposes of simplification and clarity, much of the description of this specification and several of the examples discussed are related thereto. However, it is expressly emphasized that the invention is not limited to combinations with, or applications in the environment of editing systems per se.

For example, a single record may store several species of related intelligence, such as the elevations, visual band reflectivities, radar reflectivities, infrared reflectivities, and other properties of a geographical region. As another example, an automatic signal reader constructed in accordance with the principles of this invention may be utilized to: print or display the graphic representations (i.e., the two dimensional spatial representations of characters of the alphabet and related symbols), or to orally present the audio representations, or to do both, depending upon the needs of the situation.

Such multi-mode storage systems have wide application in such fields as, for example, audio-visual education, aerospace reconnaissance image interpretation, cryptography, computer input-output, language learning, automatic teaching or self-teaching machines, and as indicated above, automatic editing systems.

The term "edit" or "editing" is used here in its broad sense and denotes any deliberate treatment or change in written records including, for example, such processes as correcting, inserting, excerpting, correlating or integrating different records, change of format or medium or type font, and others.

In this connection, an important aspect of the problem of facilitating the handling and generating of semantic information is the editing or revising of typewritten or printed material, and then retyping or reprinting the revised work. In a typical case, an author of, for example, a technical paper causes a first draft to be typed as from his dictation. The author then proofreads and edits the first draft with his corrections, deletions, and insertions. The first draft is then manually retyped and the author again proofreads it. This process requires the cost of labor of manually retyping the edited work and that of the author proofreading, after each retyping, and it is known from empirical observations that with each reiteration of a manuscript, both the probability of typing errors and that of proofing errors are significantly increased. Thus, in this example, when the material is proofread for the second time, errors may be overlooked; and when the material is then retyped, it would be expected that additional errors would occur unless extraordinarily stringent and costly effort is exerted to preclude them. This process is usually repeated a number of times (in many cases involving the retyping of a book there may be ten or more such retypings).

Such processing is not only directly costly, but is inherently time consuming and causes indirect costs in public relations or good will, particularly, for example, when the errors are made in billing or otherwise dealing with a business customer. Such disadvantages are manifest as such whether the record is being slightly changed or corrected, or whether entirely new documents are being generated on the basis of excepts from other records or documents.

These disadvantages severely limit the integration, correlation, and other processing of available information in business records, as well as in scientific and government activities, whether on an individual or a collective level. Such disadvantages, which may be termed "inefficiencies," also prevent the utilization of the great potential of modern computing equipment to be applied to make recorded categorized knowledge available to increase the effective brain power of the individual.

It is therefore an object of the present invention to provide a novel automatic signal reader and method for detecting and interpreting a plurality of species of signals as on a records medium.

It is another object of the invention to provide a novel, automatic, electrical-optical edit signal reader and method which may be utilized in combination with a system for automatically editing records and the like.

It is another object to provide an edit signal reader for detecting and distinguishing the color and the orientation in a matrix of handwritten marks on typed or printed man and machine readable records.

It is another object to provide such a system which generates edit signal sensing information to enable the control of one or more automatic readers and one or more automatic writers or typewriters thereby to generate automatically new records incorporating the desired editing changes.

It is another object of the present invention to provide a method and system for automatically editing records and the like to provide improvements in the speed and economy of publishing documents, maintaining industrial and commercial records, and keeping library and inventory-type records.

It is another object to provide such a system which permits manual insertion of editing marks on the original manuscript or record, which editing marks are machine readable while the characters on the manuscript are also machine readable as by a character recognition device or, more generally, a pattern recognizing network.

It is another object to provide such a system which automatically reads and interprets man-made editing marks.

It is another object to provide such a system and method which may facilitate automatically combining different records or data into one new record.

It is another object to provide such a system which may facilitate fast and inexpensive access to very large files as for merging or synthesizing records or for the processing of data from the records, the physical access being performed by a man who is operating the system, or is providing access at the request of the machine.

It is another object to provide such a system which is useful with high speed computers such that the computer output may be read and edited and directly fed back to the computer without the requirement of translating from a tape to a man readable page for editing, and then manually translating the edited work back to a machine readable tape for further computer processing.

Briefly, in accordance with an example of one aspect of the present invention, these and other objects are achieved as follows. A man and machine readable record is provided as, for example, from a typewriter whose type font may include, along with a conventional character, an encoding bar which provides a machine readable impression. Alternatively, the type font may be conventionally unitary, but readable by an appropriate print reader. In either event such a record is then man-read by one who indicates editing changes by manually scribed colored marks applied to particular portions of the character spaces. In a simple example, a red line across the top of the character space may be an edit instruction to "begin deletion"; while a blue line along the bottom of a subsequent space may indicate "end deletion."

The edited record is then fed into an automatic print reader which scans the print and generates sequential electrical signals which are coupled to an automatic writer in a manner to cause it to generate a new record based upon the content of the original record. Associated with the print reader is the edit signal reader which monitors or scans each character space and, in the above example, detects the red mark, its color and its orientation as being across the top of the character space. This signal or message is automatically interpreted and a signal is generated to cause the automatic writer to stop printing or advancing until the automatic print reader advances to the character space having the blue editing mark across its lower edge. The edit signal reader detects and interprets the blue mark as an "end deletion" instruction and generates a signal to cause the automatic writer to resume printing, in accordance with the material on the original record following the "end delete" mark.

It should be noted here that the term "interpretation" includes pattern analysis, and more generally the conversion of editing signals to editing commands or instructions. Also, a pattern is defined here as correlated information of more than one bit, i.e., more than one yes-no decision. Thus a specific edit signal in a specific location of a matrix of possible locations is a pattern.

Briefly, in this example, the edit signal reader comprises a plurality, equal to the number of discrete matrix areas associated with the character space, of photosensitive detectors each of which views a particular one of the matrix areas. The character space is illuminated by a white light source and each detector generates an electric signal indicative of the light it receives reflected from its respective matrix area.

Interposed between the detectors and the character space on the record being read is a lens system which focuses the character plane at an image plane. A transversely vibrating slit shutter is disposed in the image plane ahead of each detector and causes the detector effectively to scan across its matrix space back and forth looking only at a small portion of the character space at any instant of time. Thus the reflected light received by a detector may fluctuate if an editing mark exists in its respective matrix space against a reflective white background; for example, the light upon the detector would be at a minimum magnitude while the detector was "looking at" the editing mark and would be at a maximum when the detector was looking at a portion of white background. Thusly, an editing mark may be detected in a known matrix space, but its color would be unknown.

Also interposed between the printed record and the detector or when desired, between the record and the light source, is a rotating color filter disc having three transmissive sectors each having a color of one of the possible editing mark colors. The filter rotates relatively slowly as compared with the vibrating frequency of the scanning slit shutters and is arranged to interpose a filter of a particular color in the light path of all three detectors substantially simultaneously. The filter rotates one revolution during the time that the character space is being read. Thus, each of the three detectors views its respective matrix space through each of the three filter sectors in turn.

The electrical output signal on each detector then contains all the necessary information as to whether an edit mark exists in the particular matrix space and what its color is: if the output is constant during the traversal of the first color filter sector, that is, there is no contrast seen as the detector scans the space, then there is no edit mark in the space or there is an edit mark having the color of the first filter sector; if the detector has a constant output during the traversal of the second and third filter sectors then the non-existence on edit mark is confirmed; if there is a contrast detected with the second and third sectors, then the existence of an edit mark of the color of the first filter sector is confirmed. These signals are then prepared for their use by a logic network that controls the various operations of the automatic readers and writers.

Other examples of the invention utilizing relationships between the edit marks and filter colors that are different from those employed in the above example and further details of these and other novel features and their principles of operation, as well as additional objects and advantages, will become apparent and be best understood from a consideration of the following description taken in connection with the accompanying drawings which are all presented by way of example only and, in which.

Referring more specifically to the figures, there is shown a number of specific embodiments and details. The particular detailed showing, however, is chosen and presented for the purposes of clarity and a ready understanding of the principles of the invention, and is not intended to be taken as a limitation of the scope of the invention which is rather to be measured by the appended claims forming a part of this specification.

Figures 1, 2:
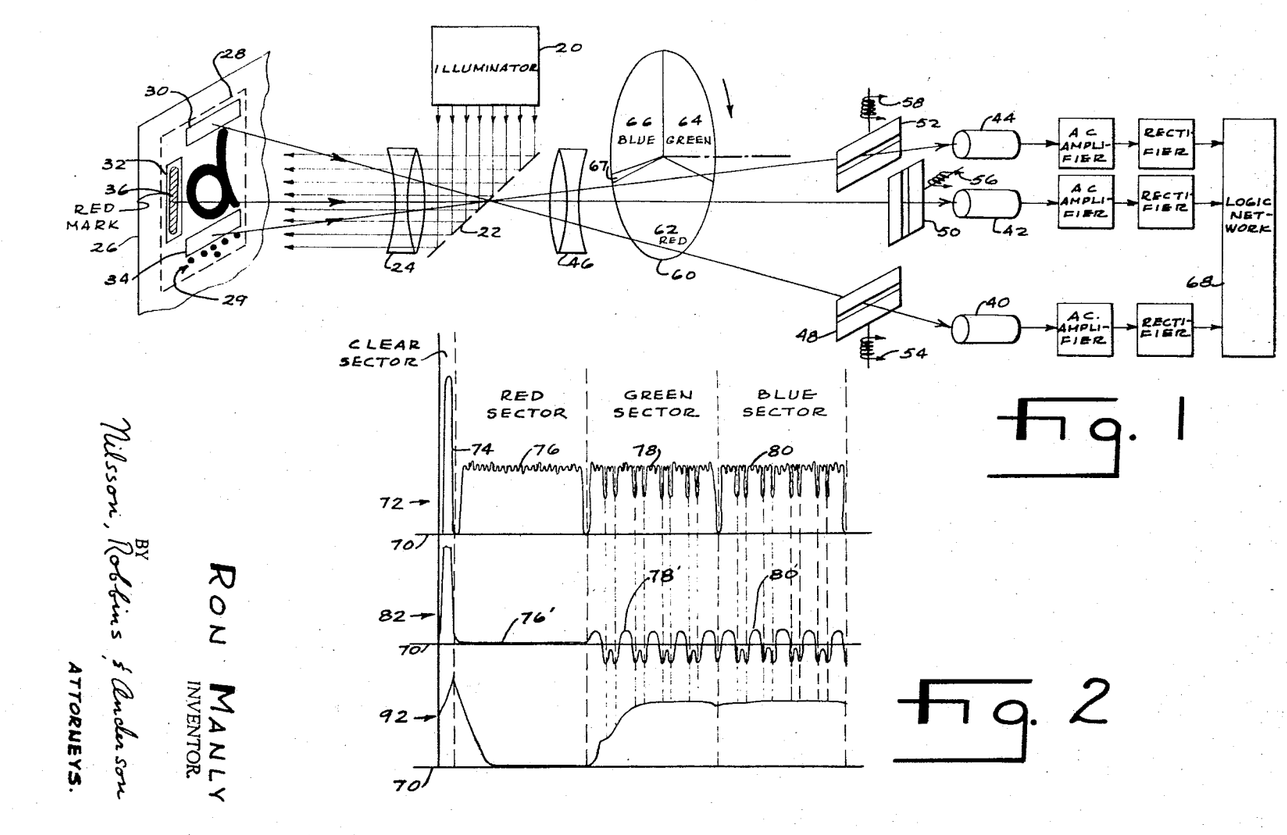
FIG. 1 is a schematic diagram of one embodiment of an edit signal reader constructed in accordance with the principles of the present invention.
FIG. 2 is a set of graphs showing voltage versus time for the purpose of explaining the function of the apparatus of FIG. 1.

In the example of FIG. 1, an embodiment of the invention is illustrated in which an illuminator 20 projects white light upon a half mirror 22 which in turn directs the light through an achromatic lens combination 24 upon a sheet 26 of a record and in particular upon character space 28 thereof. The character space 28 has in this example been imprinted with a man readable character d and may also include a corresponding machine readable character comprising an array 29 of digital information bits. In addition, the characters space 28 may have had an editing mark or marks scribed thereon for machine detection and interpretation in accordance with the present invention. In this example, three possible edit mark positions 30, 32, 34 are shown as comprising a matrix into which a colored editing mark may be placed; its particular position therein and its particular one of three machine distinguishable colors specify a discrete one of sixty-three different possible "messages" or editing instructions.

It should be noted that the colored marks may be scribed by an appropriate colored pencil or a pen. In certain applications they might be typed in. Still other methods of making the editing marks are obvious such as the use of impression devices such as a rubber stamp.

As mentioned earlier, the capability for machine reading of the character need not stem from the utilization of an encoded impression applied in the same character space: the man readable character may itself be read by any appropriately capable print reader or character recognition device; or the machine readable character may be spaced apart from the man readable character.

When the edit marks are to be applied near-by or over the machine readable impression, whether it is encoded information or the man readable impression, means is provided to preclude the machine reader from being confused by the presence of the edit mark. Such means, in one practical embodiment of the invention, is in the form of filters in the path of the light from the character impression to the print reader. The colors of the edit marks are selected to have a common portion of the spectral band which the filters do not absorb. The print reader filters selectively remove the spectral energy that may be in any band but this common band. Thus an edit mark near-by a printed character will result in the same spectral band being transmitted to the print reader detectors that would result if the mark were not there, because only the spectral energy in the common band reaches the detectors anyway, and none of this is absorbed by the edit marks. Such edit marks near-by the character printing may be either opaque or transparent. If in a particular application it is desired to allow the edit marks to not only be near-by but to overlap the characters printing, then it is necessary that they be transparent to at least the common band for the character recognition device, otherwise the print reader will not detect a portion of the printed character, for example an O might be detected as a C if an opaque edit mark covered the right portion of it.

This difficulty is avoided by the use of edit marks which are transparent for this common spectral band for the print reader. Such edit marks would be satisfactory for most applications. However, a further improvement is possible; in this latter configuration the edit signal reader will not detect that portion of the edit mark which overlaps the character printing because the black printing will absorb the spectral band peculiar to the color of the edit mark. This, in certain applications, is circumvented by choosing the edit mark colors and the "black" ink for the character printing so that the "black" printing has relatively narrow spectral reflecting bands which match the bands peculiar to the color of each of the edit marks. Then even with the transparent edit mark overlapping the printing, the color of the edit mark would be detected because its peculiar color spectral band would be reflected off of the printing. Also the presence of the printing would be detected by the print reader because the common spectral band that is allowed to reach its detector would not be significantly affected.

An alternative example which accomplishes this last result is a system which utilizes edit marks which are transparent to a common spectral band for the print reader, and each of which is opaque to and reflects the spectral band or bands used for identifying it.

Other means for avoiding confusion between edit mark and printed character will become apparent to those skilled in the art from the description below of the spectral definitions and principles utilized in the present invention.

In FIG. 1 a red editing mark 36 is shown as having been scribed in the matrix position 32 to indicate, for example, "start delete here." Each of the edit mark positions has a respective photo-detector 40, 42, 44 associated with it into which is focused the light from the illuminator 20 which is reflected from the respective matrix space. The reflected light from, for example, the matrix space 30 on the sheet 26 is transmitted through the lens 24 and a second achromatic combination lens 46, and is then impressed upon the photo-detector 40. The photo-detectors are photosensitive elements for converting the radiant energy reflected from the character space on the sheet 26 into an electrical signal. Several different types of devices may be used satisfactorily. For example, a conventional photomultiplier tube is particularly desirable when maximum sensitivity is desired. However, a simpler component is a germanium or silicon photodiode. These are P-N junction photoconductive cells and are satisfactorily broad band in their response over the optical spectrum. Although such photocells do not give equal response to different portions of the spectrum, compensation may be inserted in the system to provide, effectively, an even response by judicious selection of the characteristics of the basic system components such as those of the filters, illumination source, edit mark substances, as well as those of the photo-detectors themselves, and/or by inserting a compensating component. For example, a filter with greater attenuation in a spectral region where the detector has an unevenly high response may be interposed over the aperture of the detector. Also, the use of ratio computing circuitry, discussed below, provides color detection which is relatively insensitive to moderate variations in photo-detector response over the spectrum. In some applications, on the other hand, a photovoltaic element or even a photoresistive element functions satisfactorily in spite of their lower dynamic frequency responses and sensitivity and somewhat larger size.

Interposed in the path of transmission at the image plane of the optical system is a slit shutter 48. Similar slit shutters 50, 52 are interposed respectively before the photo-detectors 42, 44. The length of the aperture of each of the slit shutters is oriented parallel to the length of the image of its associated matrix space on the sheet 26 and has a width of the same order as that of the image of an edit mark scribed in the matrix space. Each of the slit shutters 48, 50, 52 is oscillated at an audio range frequency laterally back and forth across its respective matrix space image by a solenoid driving coil 54, 56, 58.

A rotating disc filter 60 also is disposed in the optical path between the sheet 26 and the photo-detectors. The filter is divided in three substantially equal differently colored sectors, for example, a red sector 62, a green sector 64 and a blue sector 66 with a minute clear sector 67 between the red and blue portions. The axis of rotation of the rotating disc filter is parallel with the optical path and is displaced laterally therefrom so that a sequence of the colored sectors may be interposed in the optical paths to the photo-detectors. The period of rotation of the disc filter is equal to the time or sub-multiple thereof that a particular character space 28 is to be observed before switching to the next space. In this manner, each of the detectors views its respective matrix space at least once through each of the three color sectors of the filter disc.

Each of the photo-detectors provides an electrical output signal which is representative of the light intensity input to the detector and is coupled to an alternating current amplifier and rectifier. Each of the rectifiers is in turn coupled to a logic network 68 which is of the character to provide a specific output signal or command response to and representative of the particular pattern of information from the detectors.

In FIG. 2 the voltage output signal of the detector 42 is illustrated by a set of voltage versus time graphs having a common time axis 70, the length of which as used in the figure is the period of one revolution of the rotating disc filter 60 of FIG. 1. The time axis 70 is divided into four sectors corresponding to the red, green, blue and clear sectors 62, 64, 66, 67, respectively, on the filter 60. These sectors of the time axis 70 are delineated by dashed lines which are parallel to the ordinate, or vertical as viewed in the figure.

The graph 72 illustrates the voltage output signal of the detector 42 as the differently colored sectors of the filter 60 pass across its view of the matrix space 32 which, in this example, contains a red edit mark 36. During the traversal of the clear sector 67, the intensity of reflected light is relatively high and a synchronizing or reference pulse 74 having a high amplitude is provided by the detector 42. As the red sector 62 traverses the view of the detector, it sees only an effectively blank matrix space because the light reflected from the red edit mark 36 is substantially the only component of light that the red filter sector 62 can pass. The matrix space during that portion of the period appears to the detector to be solidly red, and thus the scanning action of the slit shutter 50 back and forth across the image of the edit mark 36 does not cause a significantly modulated output signal because there is effectively no contrast between the mark and its white background. In other words, both appear red to the detector 42. The output signal of the detector 42 is therefore represented by a substantially constant voltage level 76 during the "red" sector.

During the traversal of the light path by the "green" and "blue" sectors 64, 66, however, the red edit mark reflecting only a color of light which those sectors will not pass appears as a black mark against a lighter, blue or green background. As the slit shutter 50 scans back and forth over the mark, the contrast is detected and causes the voltage output of the detector 42 to be modulated with the frequency of the vibrating slit shutter as shown by the graph segments 78, 80. The function of the slit shutters is to obtain a larger effective alternating current signal level. Without the shutters the contrast difference due to the presence of a mark would be reduced by the ratio of the area of the mark to the total area of the matrix space subtended by its associated detector. With the slit shutter, the signal is enhanced because the area sensed at any instant of time is small and thus the above ratio has much less reduction effect.

The graph 82 illustrates the result of operating upon the signals shown in the graph 72 with the alternating current amplifier shown coupled to the detector 42. The signal represented by graph segment 76, having a substantially constant value or zero alternating current component, provides a substantially zero output signal 76' from the alternating current amplifier. The voltages represented by the graph segments 78, 80, on the other hand, contain alternating current components which are amplified by the alternating current amplifier and provide output signals therefrom as represented by the graph segments 78', 80' of the graph 82.

The graph 92 illustrates the results of rectifying the signals of the graph 82 and integrating the result with a short time constant integrator. Thusly the information as to the color and existence of an editing mark in the matrix space monitored by the detector 42 is transformed to a form readily interpretable by the logic network 68.

However, the information inherent in the signals of graph 72 may be treated by other methods to distinguish the character of its different segments; for example, a frequency discriminator could be used or the signals could be directly rectified and integrated, when their amplitudes are sufficient to permit the deletion of the alternating current amplifier.

Figures 3, 4, 5:
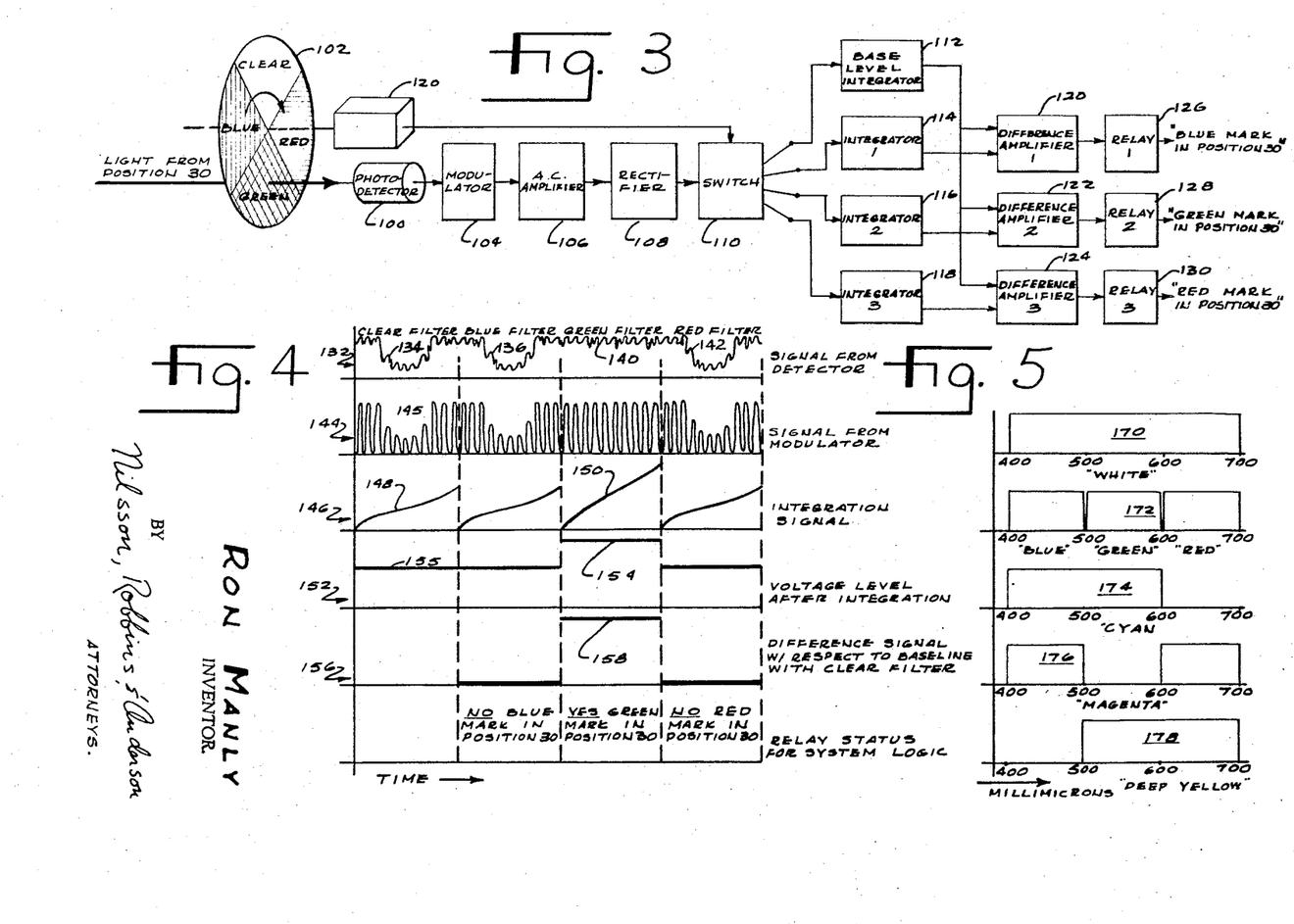
FIG. 3 is a schematic diagram of an alternative example of a portion of an automatic edit signal reader according to the present invention.
FIG. 4 is a set of graphs of signal voltage versus time associated with the functions of the apparatus of FIG. 3.
FIG. 5 is a group of spectral charts illustrating and defining the wavelengths of various colors associated with the principles of operation of the present invention.

Referring to FIG. 3, there is illustrated an alternative color discrimination circuit that is similar in some respects to that considered in connection with FIG. 1. In the example of FIG. 3, it is assumed that a green editing mark exists in the position 30 of the character space 28 on the sheet 26 as seen in FIG. 1. Light from the position 30 is impressed upon a photo-detector 100. Interposed in the light path to the photo-detector 100 is a color filter 102 which, for the sake of simplicity, is shown as a rotating circular filter but may alternatively be in any form which sequentially interposes a predetermined set of color filters in a known sequence across the light path to the photo-detector 100.

The electrical output of the photo-detector 100 is impressed upon a modulator 104 which converts the output of the photo-detector 100 into a signal having a strong representative alternating current component. The modulator 104 is coupled to an alternating current amplifier 106 which amplifies the alternating current component introduced by the modulator 104 and impresses the result upon a rectifier 108. The output signal of the rectifier 108 is sequentially and selectively coupled through a switch 110 to a base level integrator 112, a first integrator 114, a second integrator 116, and a third integrator 118.

The switch 110 is mechanically or electromechanically coupled to a motor 120 which motivates the motion of the color filter 102. The switch 110 is synchronized with or servoed from the rotation of the color filter such that the rectifier 108 is effectively coupled to the base level integrator 112 when a clear quadrant of the filter is interposed in the light path to the photo-detector and in a like manner coupled to the first integrator 114 when the blue sector of the filter is interposed in the light path. In like manner, the second and third integrators 116, 118 are coupled to the rectifier 108 when the green and red, respectively, sectors of the color filter are interposed in the light path to the photo-detector. The output of the base level inegrator 112 is coupled to one input terminal of each of three difference amplifiers 120, 122, and 124. An opposite input terminal of each of the difference amplifiers is coupled respectively to the first, second and third integrators 114, 116, 118. The difference amplifiers may be conventional networks which provide at their output terminals a voltage signal which is a measure of the difference between the voltage signals on the two input terminals at any instant of time. The output of each of the difference amplifiers is coupled to a respective relay 126, 128, 130.

In operation, reference may be made to the graphs of FIG. 4 which illustrate voltage signals as a function of time at various points in the system depicted in FIG. 3. A common time axis on the abscissa is utilized for ready correlation of the separate graphs. The length of the time axis is the period of time for one period or revolution of the color filter 102 and is divided by the dashed vertical lines into segments of time which are identified by the presence of the particular color sector of the filter interposed in the light path to the photo-detector 100. A first graph 132 is a plot of the voltage output of the photo-detector 100 as first the clear sector and then the differently colored sectors of the filter 102 as swept across its view of the position 30. As the matrix space is scanned, as by a slow moving slit shutter, with a clear filter sector interposed in the path, the graph sector 134 illustrates a voltage minimum near its center point corresponding to the detector viewing the green editing mark in the position 30. The green editing mark, of course, reflects less light than its white background. In like manner, a graph segment 136, with a similar dip therein, illustrates the voltage output of the photo-detector 100 during the interposition of the blue sector of the filter 102.

The graph segment 140, on the other hand, does not experience the voltage dip of the preceding segments because the photo-detector looking through the green sector of the filter does not detect any contrast between the green editing mark and its apparently green background. The graph segment 142, similarly to graph segments 134, 136, illustrates the detector output when a filter sector of a color different from that of the color of the editing mark is interposed in the path of the light to the photo-detector.

A graph 144 illustrates the result of the signals shown in the graph 132 after they have been modulated by the modulator 104. The envelope 145 of the voltage signals on the graph 144 is seen to correspond to the shape of the voltage curves of the graph 132.

A graph 146 illustrates the result of integrating the signals illustrated by the graph 144 after they have been amplified by the alternating current amplifier 106 and rectified by the rectifier 108. The curves of the graph segments of the graph 146 are actually separate and are those which appear at the output of the four different integrators 112–118. For example, the graph segment 148 is a plot of the voltage output of the base level integrator 112 while the graph segment 150 represents the voltage output of the second integrator 116. The graph 152 illustrates the final voltage level at the output of each of the integrators and illustrates that the integral of the signal of the second integrator which represents the photo-detector output during the passage of the green sector of the color filter 102 is significantly greater in magnitude than the final voltage levels of the other integrators.

The graph 156 illustrates the output signals of each of the difference amplifiers 120, 122, 124 and shows the difference between the height of the voltage level 154 and that of the voltage level 155 which is representative of the output signal of the photo-detector 100 during the passage of the clear sector of the filter 102. The output of the difference amplifier 122 is therefore a relatively high value 158 compared to the other two which may be substantially zero. The voltage represented by the level 158 may be utilized to change the state of the relay 128 which indicates to the user or to the logic network that a green edit mark exists in the position 30 and that at that time no blue or red marks existed in that space nor was the space void of any editing mark.

The color discrimination apparatus illustrated in FIG. 3 is particularly adaptable for use in a system in which there is a sequential search of the matrix positions as well as of individual areas within each of the matrix positions and in which the colors are not instantaneously detected but are detected by integration of signals obtained during the scanning for a given character position. It may be noted that the first, second and third integrators 114, 116, 118 may be physically the same integrator with the switching sequentially connecting the common integrator to each of the difference amplifiers in turn. It should be noted that the use of integrated, rather than instantaneous, detection methods may be applied by a person skilled in the art, to any of the various embodiments described in this specification.

For use in describing the functions of the apparatus of subsequent figures, the set of graphs of FIG. 5 are presented for the purpose of defining specific portions of the visual spectrum and labelling them for a clearer understanding of their use.

It is pointed out that in this specification, the term "color" is used in its objective sense of referring to electromagnetic characteristics of an "object" over portions of the frequency spectrum, usually the visual, infra-red, and ultra-violet portions. The "objects" may be "light," edit or other signal marks, filters, etc. The electromagnetic characteristics may be spectral reflectance, spectral transmittance, energy distribution over the spectrum, sensitivity of a photosensitive detector, etc.

Similarly the term "light" is used to refer to electromagnetic energy, usually the visual, infra-red, and ultra-violet portions but not necessarily limited to those regions.

All of the graphs of FIG. 5 utilize a common abscissa which, in this case, is calibrated in millimicrons. A graph 170 shows the idealized frequency characteristics of a "white light" illumination source. It is shown as having a uniform intensity from 400 to 700 millimicrons, this range being essentially that of the visual band of light. It should be noted that the broad width and sharp cutoff characteristics assumed throughout the graphs of FIG. 5 are not in any way necessary to the method or operation of the process of the invention. Rather they are thusly assumed to simplify the conceptional understanding of the method. This same uniform intensity assumption applies usefully to the photo-detector sensitivity and to the reflectivity characteristics of the white paper as discussed throughout this specification.

The graph 172 illustrates the defined reflectivity characteristics, that is, the spectral distribution of the light reflected from edit marks of "blue," "green," or "red" color when illuminated by the white light represented by the graph 170. These same spectral reflectivity characteristics also apply to the spectral distribution of light passing through colored glass or other filters of the colors indicated when the light source to the filters is the white light of the graph 170. The graph 174 illustrates the definition of the color cyan which is spectrally the combination of blue and green as defined by the graph 172. The graph 176 in like manner defines the color magenta as being spectrally the combination of blue and red. As indicated by the graph 172 the wavelengths between 400 and 500 millimicrons are defined as blue and between 600 and 700 millimicrons as red. Graph 178 defines deep yellow as being the combination of green and red or the wavelength range between 500 and 700 millimicrons inclusively.

Based upon the preceding spectral definitions of the colored marks and filters, the following table indicates the combinations of the colored marks and filters which result in a substantially zero output.

TABLE A

| Color of mark: | Color of filter |
| --- | --- |
| Blue | Red, green, or yellow. |
| Red | Blue, green, or cyan. |
| Green | Red, blue, or magenta. |
| Magenta | Green. |
| Cyan | Red. |
| Yellow | Blue. |

The following table, Table B, indicates all of the combinations of colored marks and filters which result in blue, green, or red light as the output:

TABLE B

| BLUE output | GREEN output | RED output |
| --- | --- | --- |
| Blue mark and blue filter. | Green mark and green filter. | Red mark and red filter. |
| Blue mark and cyan filter. | Green mark and cyan filter. | Red mark and magenta filter. |
| Cyan mark and blue filter. | Cyan mark and green filter. | Magenta mark and red filter. |
| Blue mark and magenta filter. | Green mark and yellow filter. | Red mark and yellow filter. |
| Magenta mark and blue filter. | Yellow mark and green filter. | Yellow mark and red filter. |
| Magenta mark and cyan filter. | Cyan mark and yellow filter. | Magenta mark and yellow filter. |
| Cyan mark and magenta filter. | Yellow mark and cyan filter. | Yellow mark and magenta filter. |

To illustrate the significance of the data in FIG. 5, Table A and Table B consider a system using red, green, and blue editing marks. A red filter may be used to detect a red mark because it will give a full signal output only when a red mark (or a white surface) is being illuminated. If a green or blue mark is being illuminated it will give no signal. However, to distinguish the red signal situation from a white light reflection, it is desirable to utilize the information from another filter complementary to the red band, namely the cyan filter. If the red mark is present there will be no signal from the cyan filter. For any other colored mark, that is blue or green or any color whose spectral band includes light within the spectral band of the blue or the green or both; or for a white signal, there will be an output from the cyan filter. Thus, when there is an output from the red filter and none from the cyan filter, the mark must be red.

Similarly, green can be distinguished and detected by using a green and a magenta filter; and for the detection of blue, a blue filter and a yellow filter may be used in the same manner.

The term "complementary" with respect to a specific reference spectral frequency distribution as used above, may be generalized for the purposes of describing the invention in this specification to refer to any spectral frequency distribution which has a significant portion of its distribution not in common with the reference frequency distribution. Thus, with respect to detecting a red mark (i.e., the reference frequency distribution is that previously defined as "red"), green or blue filters may be considered complementary by our general definition of the term.

Figure 6:
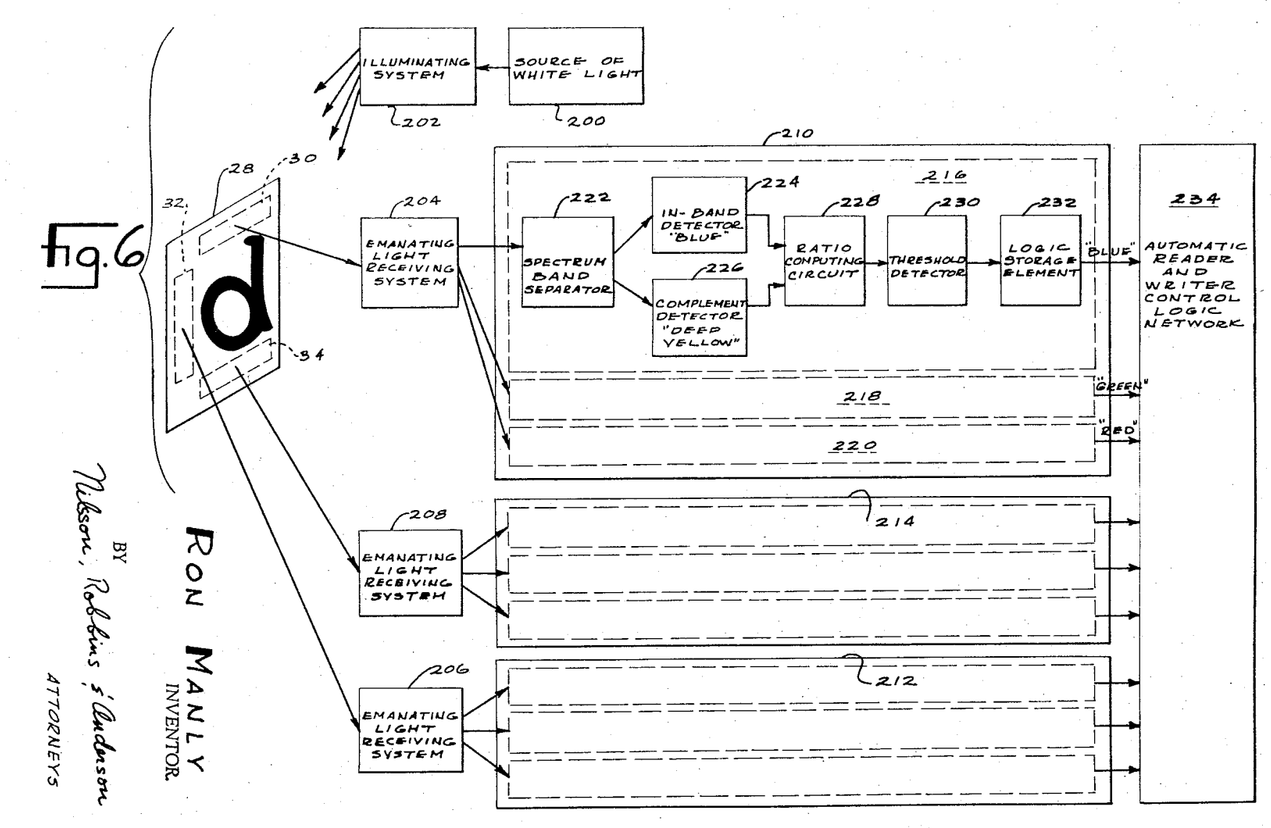
FIG. 6 is a schematic diagram of an additional example of an automatic edit signal reader constructed in accordance with the principles of the invention.

In FIG. 6 a somewhat more general embodiment of an edit signal reader system, and one which utilizes the spectrally distinguishable colors and combinations defined above in connection with FIG. 5 and the preceding tables is illustrated in a schematic, simplified form. A source of white light 200 projects a beam of light through an illuminating system 202 and onto the character space 28 to illuminate, in particular, the matrix spaces 30, 32, and 34 thereon. The light from each of these matrix spaces is transmitted by a reflected light transmitting system or, more generally, emanating light receiving system 204, 206, 208, respectively, to an associated color distinguishing circuit 210, 212, 214, respectively. In the figure only the color distinguishing circuit 210, which treats the light emanating from the matrix space 30, is shown with internal details since the other circuits 212, 214 are substantially identical with it except that they operate upon light emanating from the matrix spaces 32, 34, respectively.

It should be noted that although a color distinguishing circuit is shown for each matrix space, in certain applications it is preferable to utilize just one color distinguishing network for several matrix spaces by sequentially coupling it to each of the matrix spaces in its turn. The "switching" from one matrix space to another is accomplished either by movement of the records medium, movement of the reading device or a portion thereof, optical movement of images, or by a combination thereof.

The color distinguishing circuit 210 is shown as comprising three identical color channels 216, 218, and 220, channel 216 thereof being illustrated with internal detail. Each of the three color channels is adapted to distinguish a different color for any editing mark existing in the matrix space 30. For example, the color channel 216 is adapted to distinguish the presence of a blue editing mark.

The light emanating from the matrix space 30 is, for example, divided amplitude-wise into three separate quantities, as, for example, by partially silvered mirrors, with one quantity being directed to each of the color channels 216, 218, 220, respectively. The quantity of light thus directed to channel 216 is impressed upon a spectrum band separator 222 which separates its reflected light into two frequency bands, namely blue and deep yellow. This is accomplished in this example by a spectrum splitter such as interference filters or a refraction prism to separate the spectrum components.

Alternatively, a different type of spectrum band separator may be used. For example a beam splitter, such as a half-silvered mirror, may be used to separate the light amplitude-wise into two channels, and each channel may contain any appropriate filter that may be required, namely, in this example, a blue in one channel and a deep yellow in the other channel. The blue portion thus divided is impressed upon an in-band detector 224 while the deep yellow portion is impressed upon a complementary-band detector 226.

It is pointed out that the use of the term "in-band" and "complementary-band" (and, later, that of "out-band") is not to be taken as limiting the invention to the detection of colors having only a single, continuous band of frequencies. Rather, it is intended that the colors dealt with may be made up of a number (including one) of either continuous or discontinuous frequency bands.

The electrical output signals of detectors 224, 226 are pressed upon opposite input terminals of a ratio computing circuit 228 which is a conventional manner provides an output signal which is a measure of the relative amplitudes of the signals at its input terminals. (The desired ratio is, of course, that of the in-band signal divided by the complementary-band signal.)

The radio computing circuit may be: a circuit which mathematically derives the ratio of the two input amplitudes, or an adequate approximation thereof; a conventional difference amplifier, or any means for approximating the difference of the two input amplitudes; or a logical circuit for determining the presence of an in-band signal and the absence of an out-band signal.

The output of the ratio computing circuit is then coupled to a threshold detector 230. The output signal may be utilized to trigger a logic storage element 232 when the input to the threshold detector 230 is greater than a predetermined magnitude. The threshold detector 230 is pre-set at a threshold amplitude so as to be sufficiently above any possible noise to indicate reliably the presence of the desired signal. The logic storage element 232 may be a flip-flop or a relay and in some applications may readily function as its own threshold detector. A change in the state of the logic storage element 232 indicates that an edit mark exists in the matrix space 30 and is blue in color. This information is stored or supplied when needed to the automatic reader and writer control logic network 234. This automatic reader and writer control logic network (as well as, in other embodiments, the "logic network," the "movement control logic," "movement and printing control logic," function implementation logic, command implementation logic, and other such logic means) may include an edit signal pattern analyzer or recognizer which interprets the edit signal patterns by converting them into edit commands which then are implemented by control signals to the automatic reader and writer. More generally, a logic network may include signal pattern analysis means which interprets the signal patterns by converting them into commands which may be implemented directly, or may be stored as for record purposes, and/or for later implementation.

It should also be noted that the signal pattern recognizer is not restricted as to type. The type utilized in a particular example may be one whose principle of operation is based upon analyzing: positions of dots or straight lines; symbols made up of dots, or of straight or curved lines; pluralities of discrete differences, such as colors or the level or magnitude of a physical aspect of the signal; or the like.

Each of the color distinguishing circuits 210, 212 and 214 has three output terminals which are coupled to the network 234. Each of the output terminals indicates, when energized in a predetermined manner, a particular color of editing mark in a particular matrix space. Thus, the logic network 234 is driven by the nine inputs indicated below.

TABLE C

| Matrix Spaces | Colors Detected | | |
| --- | --- | --- | --- |
| | Red | Green | Blue |
| 30 | $S_{30r}$ | $S_{30g}$ | $S_{30b}$ |
| 32 | $S_{32r}$ | $S_{32g}$ | $S_{32b}$ |
| 34 | $S_{34r}$ | $S_{34g}$ | $S_{34b}$ |

Each $S_{ij}$ is in either a one or a zero state depending upon whether a mark of that color has been detected in that matrix position for the specific character space being read or examined.

As an example, a "start delete" command might be indicated by a green edit signal in the matrix position 32. The corresponding color logic state would be $S_{30r}=0$, $S_{30g}=0$, $S_{30b}=0$; $S_{32r}=0$, $S_{32g}=1$, $S_{32b}=0$; $S_{34r}=0$, $S_{34g}=0$, $S_{34b}=0$. This may be referred to as a 000, 010, 000 state.

As another example "insert hyphen and return" command, might be indicated by red signals in both positions 30 and 34. The corresponding color logic state would then be 100, 000, 100. As still another example, an "insert" edit signal might be indicated by a red signal in position 32, this state would then be 000, 100, 000.

To illustrate the actual operation of the logic, the following is presented. Consider the existence of a set of control logic state "relays" or other equivalent switching devices. Two of these relays and the actions they control might be: (1) a reader select relay having a switch open state and a switch closed state, the former causing the reading to be from the original record and the latter causing the reading to be from an insert record; and (2) a writer operate relay having a switch open state and a switch closed state, the former causing the writer to be operative and the latter causing the writer to be inoperative or motionless. To continue the illustration, the "start delete" command represented by the green edit signal in position 32 (the logic state 000, 010, 000) would cause the writer operate relay to go into its switch closed state, thus causing the writer to be inoperative. With the system in this state, the material read by the reader would be deleted until an "end delete" signal were received or some other function was designated to return the writer to its operative state occurred. A diode network from the color logic state storage elements may control the condition of the control logic state relays.

Alternatively, some specific logic state "relays" might be controlled directly by specific color logic state storage elements. For example, the green position 32 might directly cause the writer operate relay to go into its switch closed state. In a particular application where the number of commands is limited and the commands are relatively simple, the color logic state storage element may be the the control logic relays.

Another example of the operation of the control logic relays is the setting of the reader select relay to this switch closed state by the detection of the "insert" edit signal; for example, a red signal in position 32 thus a 000, 100, 000 state of color logic.

Figure 7:
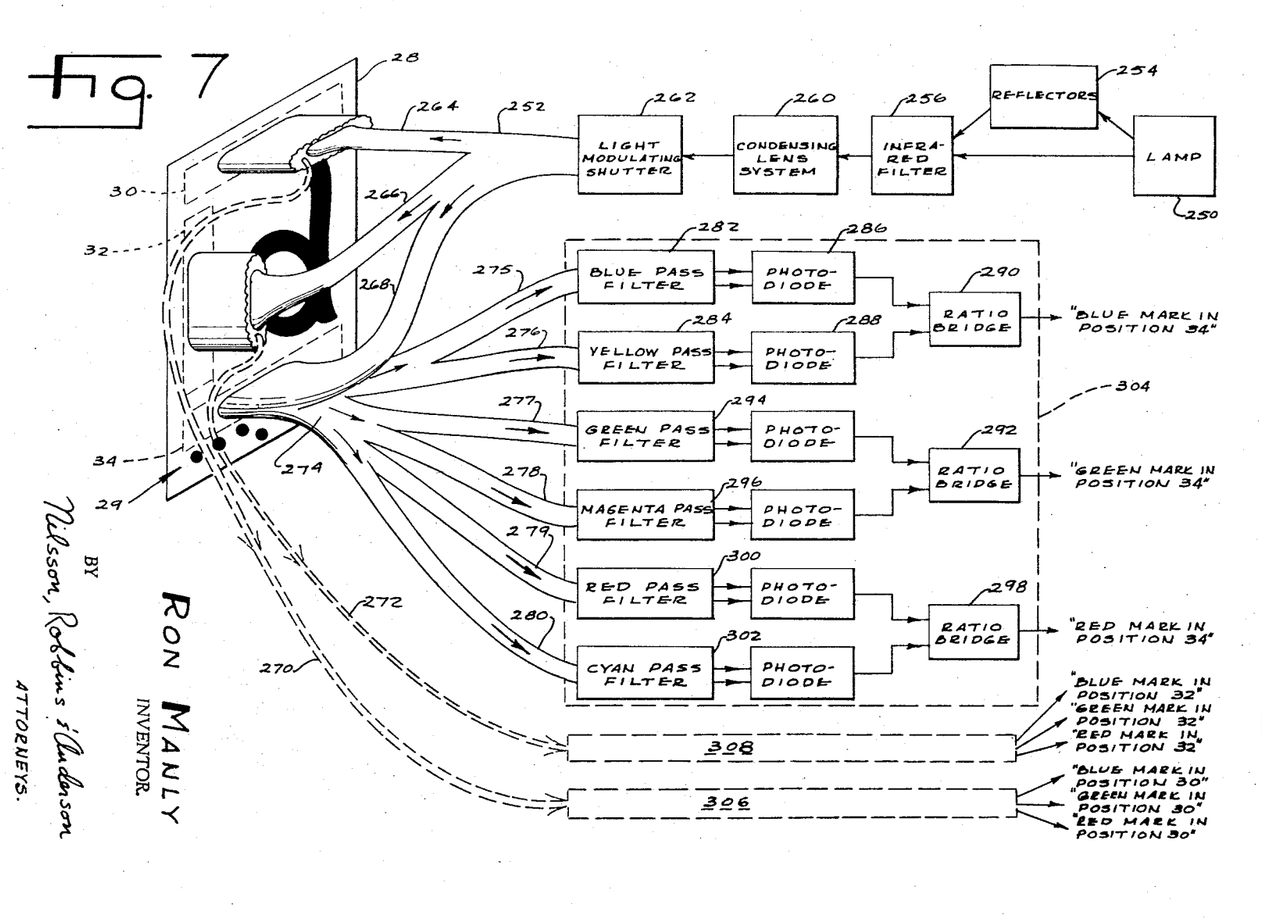
FIG. 7 is a schematic view of another embodiment of the present invention and which illustrates the utilization therein of fiber optics systems.

Referring to FIG. 7, an additional example of the invention is illustrated in somewhat greater detail. A lamp 250 which may be an incandescent bulb is provided for illuminating a set of illuminating optical fibers 252. A system of reflectors 254 cooperates with the lamp 250 to project a higher percentage of the available light toward the illuminating fibers 252. An infra-red rejecting filter 256 is interposed in the illuminating light path to remove the infra-red rays from the output of the lamp 250 which otherwise tend to heat the components and thus introduce sources of noise due to changing component characteristics. A filter 256 may cooperate with the reflectors 254 by a choice of reflectors which selectively let pass the infrared light of the optical system while reflecting the desired components toward the illuminating fibers.

A condensing lens system 260 is provided to increase the efficiency of the system by focusing the light from the lamp 250 into a beam which is impressed upon an area which includes all the fiber optics of the illuminating fibers 252. A light modulating shutter 262 is disposed in the optical path and may be utilized selectively when desired to modulate the light beam so that the signals ultimately impressed upon the photo-detectors are suppressed carrier modulated signals instead of direct current signals. This advantageously permits the use of alternating current amplifiers and thus avoids any possible drift problems which frequently occur in direct current operation.

The illuminating fiber optics 252 are divided from a unitary bundle at the illuminating system into a plurality, in this case three, of separate illuminating bundles of fiber optics each of which provides a pathway for illuminating light onto predetermined portions of the character space 28. An illuminating bundle 264 transmits substantially white illuminating light to the matrix space 30; and illuminating bundles 266, 268 similarly illuminate, respectively, the matrix spaces 32, 34. Interposed among the illuminating fibers near their ends at the sheet being read is in each of the three cases a plurality of receiving or reflected light transmitting fibers. These are shown broken away and schematically represented by the heavy dashed lines 270 emanating from the character matrix space 30 and the heavy dashed lines 272 emanating from the matrix space 32. The receiving fibers 274 emanating from the matrix space 34 are shown in a more complete form as being divided into six sub-bundles 275, 276, 277, 278, 279 and 280.

The utilization of fiber optics illuminating and sensing fibers results in a simple and reliable system in that, for example, the fibers perform not only the function of providing pathways for illumination and for sensing the emanating light energy, but they also divide up the energy into portions which contain separate items of information from the separate matrix spaces, and then direct this illumination into as many separate channels as is desired for each color to be detected. Additionally, in an encoded bar machine reader system, the fiber optics edit signal reader elements can be integrated into a single head with the reading elements for the encoded bar 29. This considerably simplifies the layout and also simplifies the logic by permitting the edit signals pertaining to one character space to be read at the same time as the encoded bar 29 rather than having to be read one or more character spaces ahead or behind thereof.

Each of the receiving light sub-bundles 275–280 transmits a substantially identical portion of the light emanating from the matrix space 34 to a particular, associated color filter. It may be noted that pairs of the receiving light sub-bundles are associated with particular pairs of color filters for the purpose of detecting and distinguishing a particular one of the possible colors for an edit mark which might be existent in the matrix space 34. For example, the receiving light sub-bundles 275 and 276 transmit their portions of the light reflected from the matrix space 34 to a blue pass filter 282 and a yellow pass filter 284, respectively.

Assuming the existence of a blue edit mark in the matrix space 34, the blue pass filter 282 would have a light output which is impressed upon a photodiode 286. In order to ditsinguish this situation from merely a blue component in white light reflected from the matrix space 34, the light output of the blue pass filter 282 is compared with the light output of the yellow pass filter 284 which is impressed upon a photodiode 288.

To make the distinction between blue light and a blue component of white light, the ratio bridge 290 requires an electrical input from a photodiode 286 and a substantially zero electrical input from the photodiode 288. If predominantly white light is being impressed on the filters 282, 284 both of the photodiodes 286, 288 have substantial electrical outputs, and the output signal of the ratio bridge 290 will be below a pres-set threshold. If, on the other hand, the mark does exist in the matrix space 34, the output of the photodiode 286 will be relatively high as compared with a substantially zero output of the photodiode 288 which results in an above-threshold output signal level of the ratio bridge 290 thereby indicating a blue mark in the position 34.

In like manner, the output of the ratio bridge 292 of an above-threshold level indicates that the output of a green pass filter 294 was significantly higher than the output of its complementary color filter 296 to distinguish the presence of a green editing mark in the matrix space 34. Similarly, a "red mark in position 34" signal output from the ratio bridge 298 indicates that the light output of the red pass filter 300 is significantly higher than that of its complementary color cyan pass filter 302.

The structure of the color distinguishing circuit 304 thusly described as being associated with the matrix space 34 is substantially duplicated by the color distinguishing circuits 306 and 308 which are in like manner associated with the matrix spaces 30 and 32, respectively. The nine possible outputs of this example indicating any one of three colors in any one of three possible matrix spaces associated with the character space 28 are coupled to the automatic reader and writer control logic network (not shown).

It may be noted that when the number of possible positions in the matrix of spaces is three, and three possible colors may be utilized, the number of distinguishable commands or messages is sixty-three, assuming a maximum of one mark in each position at any one time. If there are two possible matrix spaces and three colors, the number of distinguishable messages is fifteen.

It may be noted also that the bandpass and complementary pass filters, discussed in connection with FIG. 7 for example, which may be utilized in the practice of the present invention, may be glass filters, gelatin filters or interference filters. The glass and gelatin filters function by selective absorption. They are produced by dissolving or suspending colored matter in the glass or gelatin. Their transmission cutoff is not particularly sharp. However, as pointed out above, such is not a critical requirement for the practice of the invention. Color glass filters are available from, for example, Corning Glass Works, Alpha America Corporation and Fish-Schurman. The gelatin filters (called Wratten filters) are available from Eastman Kodak Company.

Interference type filters readily provide good transmission characteristics at any predetermined wavelength with a sharp reduction in transmission at either side. Sub-types of interference filters include Fabry-Perot interferometer and closely associated types, vacuum deposited multi-layer films, and filter mirrors consisting of thin layers of metals and dielectrics. Such interference filters are available from Baird Atomics, Bausch and Lomb Optical Company, Axler Associates, Farrand Optical Company and others.

Figure 8:
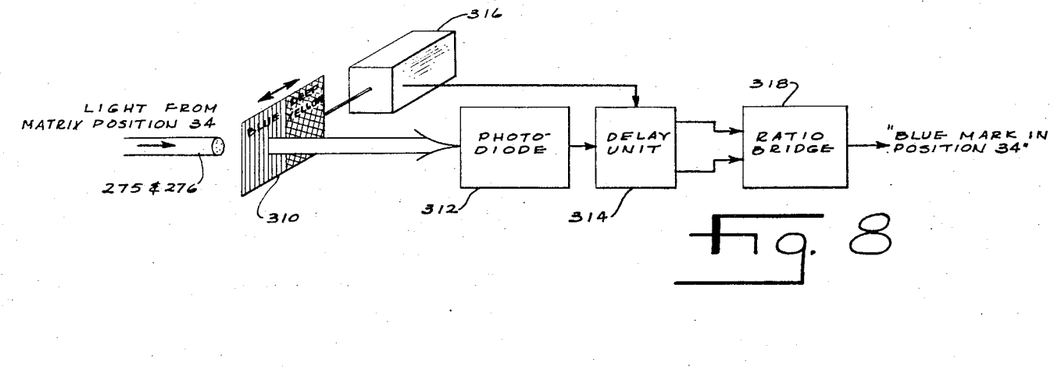
FIG. 8 and FIG. 9 are schematic views of portions of alternative examples of apparatus constructed in accordance with the principles of the invention.

Referring to FIG. 8, a form of the invention having color distinguishing networks modified with respect to those illustrated in FIG. 7, but otherwise substantially similar to the systems there shown, is presented. The reflected light which is transmitted from the matrix position 34 along the receiving light sub-bundles 275 and 276 is contained in a single sub-bundle as shown and is impressed upon an oscillating color filter 310. In this example, there are three such filters for the color distinguishing circuit 304 instead of the six separate filters shown and discussed in connection with FIG. 7. The number of photodiodes or other photodetectors is similarly halved. The light output of the filter 310 is impressed upon the photodiode 312, the electrical output of which is coupled to a storage and delay unit 314. The delay unit 314 is coupled to the mechanism 316 which oscillates the filter 310 to interpose, periodically, blue and deep yellow portions thereof across the light path to the photodiode 312. The delay unit 314 which is synchronized with this periodic motion stores the electrical signal representative of the output of the blue filter until it can be compared with the electrical output corresponding to the light output of the deep yellow filter portion.

The difference amplitude between the two electrical signals is measured by the ratio bridge 318, and an above-threshold electrical signal output thereof indicates that a blue mark exists in the matrix position 34.

Figure 9:
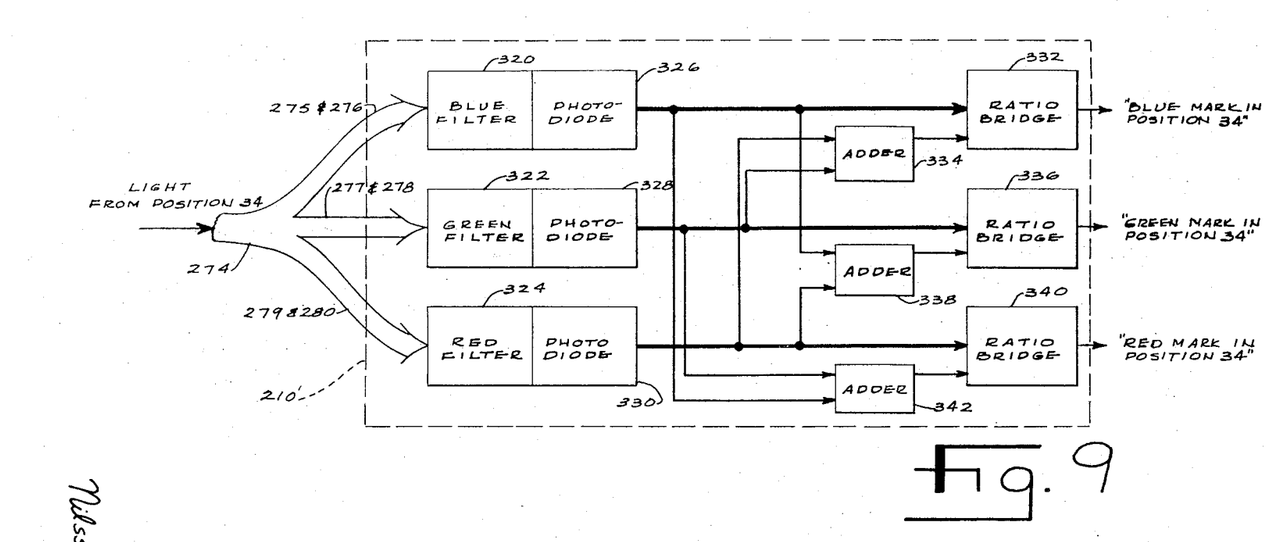

Referring to FIG. 9 a further modification of the channels within the color distinguishing circuits 304, 306, 308 of FIG. 7 is illustrated. Again, as in the apparatus of FIG. 8, only one photosensitive detector is required for each of the possible colors of editing marks. However, the system of FIG. 9 utilizes three photosensors for each channel without the requirement of time-sharing of the channel which requires either physical movement of the scanning head or the filters or optical movement of images.

In FIG. 9 the reflected light from the position 34 is transmitted toward the color distinguishing circuit 210' by the fiber optic bundle 274. The receiving light sub-bundles 275 and 276 together carry one-third of the light from the position 34 to a blue filter 320. The sub-bundles 277 and 278 together carry one-tihrd of the light from matrix position 34 to a green filter 322, and the sub-bundles 279 and 280 carry the remaining one-third to a red filter 324. Each of the filters 320, 322, 324 has a photodiode detector 326, 328, 330, associated therewith, respectively, each of which has an electrical output signal representative of the magnitude of light passed by each of the color filters associated therewith.

The particular mechanization utilized in the system of FIG. 9 is based upon the fact that if colored marks are used that are mutually spectrally exclusive, such as the blue, green, and red segments of the graph 172 of FIG. 5, the sum of the radiant energy in any two of them make up a complementary band for the third. To this end, a ratio bridge 332 provides an output indicating a blue mark in the matrix position 34 when the blue filter 320 has an output but neither of the green or red filters 322, 324 does. The ratio bridge 332 has two input terminals one of which is coupled directly to the photodiode 326 and the other of which is coupled to an adder circuit 334. The input terminals of the adder 334 are coupled respectively to the outputs of the other two photodiodes 328, 330. The output of the adder 334 is representative of the sum of the electrical outputs of the diodes 328, 330.

Thus, if white light is being carried by the optics bundle 274, the electrical output of the adder 334 will be approximately twice as large as the electrical output of the photodiode 326, and the two inputs to the ratio bridge 332 will have a ratio of approximately one half. The ratio bridge 332 will, in this case, have a zero or below threshold output signal. If, on the other hand, the optics bundle 274 is carrying blue light, such as would be reflected from a blue edit mark in the matrix position 34, the photodiode 326 would have a significant output while the other two diodes 328, 330 would each have a substantially zero output. The electrical output of the adder 334 would then be substantially zero and the ratio bridge 332 would observe a high ratio between the magnitudes of the input signals on its two input terminals and accordingly register an above-threshold output signal to indicate the existence of a blue edit mark in the position 34.

In like manner, the ratio bridge 336 indicates the existence of a green mark in the position 34 when there is an output from the photodiode 328 but no significant electrical outputs from the other photodiodes 326, 330. To this end, one input terminal to the ratio bridge 336 represents, through the adder circuit 338, the combination or addition of the electrical output signals of the blue and red filters. Again, in the same manner, the ratio bridge 340 indicates a red mark in the position 34 when the red filter 324 has an output signal which is large compared with the combination of outputs of the blue and green filters 320, 322 as combined in an adder circuit 342.

It should be also pointed out that in some mechanizations of automatic signal readers, constructed in accordance with the present invention, only one, non-moving spectral filter element is required to detect signal marks of a specific spectral distribution even when in the presence of black signal or character marks. In these mechanizations the signal marks are fluorescent, i.e., they emit radiant energy in certain spectral regions when illuminated by energy of other spectral regions. In one of these mechanizations the fluorescent mark is detectable because it emits sufficient energy in its fluorescent bands to be distinguishable—by a photosensitive detector which passes only light within these fluorescent bands—from the amount of energy reflected by white (unmarked) or black portions of the medium.

In another mechanization the white light illuminating source is filtered to remove any light in a portion of the fluorescent bands of the signal mark. The photosensitive detector filter is chosen to pass only light of this portion of the fluorescent band so that if it detected light of a significant amplitude, this indicates the presence of the signal mark.

Figure 10:
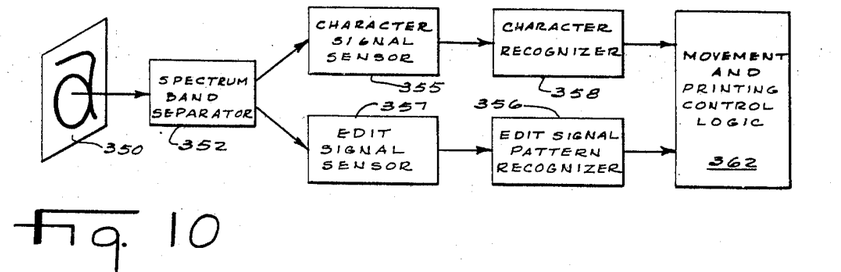
FIG. 10, FIG. 11, and FIG. 12 are schematic block diagrams of a number of alternative embodiments of the signal reader of the present invention.

Referring to FIG. 10, an electrical-optical example of the invention is illustrated in which the light energy emanating from a character space 350 is impressed upon a spectrum band separator 352 which separates the character identification information from any edit signals in the emanating light by virtue of the spectral characteristics of their respective carrying signals. For example, as discussed above, the spectrum band separator 352 may include filters in the path of the emanating light so that a character signal sensor 355 effectively sees only the "black" character impression whether or not colored edit signals are present in the emanating light.

The spectrum band separator 352, for example, may consist of: moving filter components having a plurality of filter segments such as shown in FIGS. 1, 3, and 8; light receiving means (such as shown in FIGS. 7 and 9) for viewing slightly adjacent positions from which separate channels are obtained, each of which may contain any specific filters appropriate for distinguishing its signals from those of other channels; a beam splitter, such as a half silvered mirror, to divide the energy into two channels, each containing any specific filters as in the preceding example (such as described in connection with the discussion of FIG. 6); or a spectrum splitter such as, for example, interference filters or a refraction prism (such as described in the discussion of FIG. 6). The output of the character signal sensor 355 is impressed upon a character recognizer 358 which identifies the characters on the basis of their shape or pattern, or other such characteristic.

The portions of the spectrum containing the edit signals are routed from the spectrum band separator 352 to an edit signal sensor 357 which, in this example, is of the character to detect the optical edit signal information, i.e., convert it into electrical signals and impress them upon an edit signal pattern recognizer 356 which may further analyze the signal pattern on the basis of such characteristics as color or shape or position, or combinations thereof, and thereby identify the information or command in a particular edit signal previously recorded on the character space 350. It should be noted that the edit or other signal patterns utilized in certain embodiments of the invention consist of conventional editor's marks such as carets (e.g., for inserts), or other handwritten signal patterns. In such embodiments the signal pattern recognizer consists of a sophisticated character recognition reader capable of recognizing handwritten characters or other symbols.

The output signals of the recognizers 356, 358 are impressed upon a movement and printing control logic network 362 which, as described in the previous examples, may control the printing and reading functions of the remainder of the editing system.

Figure 11:
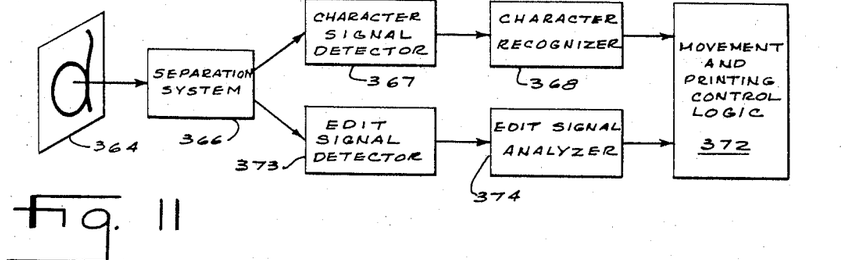

In FIG. 11, an embodiment of the invention in the form of a more general signal reader for detecting and interpreting two or more species of signals or channels of information such as, for example, a magnetic channel and an optical one is illustrated.

In this embodiment, separation of the information may be upon the basis of the "character" or "physical character" of the signals. "Character" or "physical character" includes the particular location on the record, the specific phenomena used to record each signal, and the "physical aspects" of the signals. The term "physical aspects" includes differences in magnitudes or values of amplitude of signals, modulation, specularity characteristics, frequency spectrum, and the like.

Another example of a type of system illustrated by FIG. 11 is one in which the light energy from a character space 364 is separated in a separation system 366, utilizing physical aspects other than only those based upon spectral separation techniques, into a plurality of channels containing different information, for example, as to character identification and editing commands. In one practical embodiment of the invention, the separation system 366 includes emanating light receiving means and a photosensitive detecting system which separate the character identification signals from the editing signals by virtue of their different intensities, due to the difference in reflectivity between the dull black ink of the character impression and the relatively glossy editing marks.

As in the example of FIG. 10, the character signal information is channeled through a character signal detector 367 and a character recognizer 368 to movement and printing control logic 372. The edit information signals, on the other hand, are routed to an edit signal detector 373 and an edit signal analyzer 374 which may be a pattern recognizer, a color analyzer such as shown in the previous figures, or a system which distinguishes the marks by their density or modulation generated or impressed by the editing implement. The output signals of the analyzer 374 are impressed upon the movement and printing control logic network 372.

Figure 12:
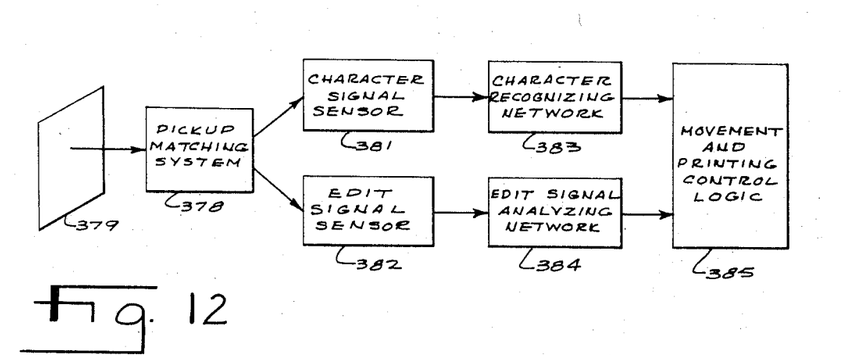

Referring to FIG. 12, an alternative embodiment of the invention is illustrated in which a pickup matching system 378 is provided which receives signals from a records medium 379 and separates them into different channels depending upon the "physical character" of the particular signals recorded. For example, the character identification information may be impressed on the records medium in the form of conductive ink while the editing command information may be in the form of a magnetic ink impression. In this example the pickup matching system 378 includes magnetic and electric or electrostatic pickup heads matched in each event to the form of signal storage being utilized on the record.

In another example the character identification information is imprinted with regular ink while the editing marks are scribed, usually visibly, with magnetic ink. In this case the pickup matching system may include an optical pickup system for detecting and channeling the character identification information to the character signal sensor 381 and character recognizing network 383, while a magnetic pickup system channels the editing information to the edit signal sensor 382 and edit signal analyzing network 384. The output signals are impressed on the movement and printing control logic network 385.

When one or more of the pickup means in the pickup matching system 378 is optical, the system 378 may include a source of light energy for illuminating the records medium. Similarly, for detecting some other types of recordings, a source of energy of a particular type may be included in the system 378.

A more general example of the application of a separation system 366 (FIG. 11) or pickup matching system 378 (FIG. 12) is that of synchronizing two closely related aspects of a message such as the pronunciation (or audio representation) and the graphic representation of verbal records.

The use of an automatic signal reader in such an example permits the visual presentation by printing or other display of the graphic representation (i.e., the two dimensional spatial representation of the characters of the alphabet and related symbols), or the oral presentation of the audio representation, or both, depending upon the needs of the situation. Thus, a machine will be able to "write," or "talk" from a signal record. Therefore, for a machine that has character recognition and speech recognition capabilities, a simple "word memory" record provides all the information necessary to "write," "talk," "read," or "listen to" words.

This capability of synchronizing two closely related aspects of a message is especially useful for such applications as: a child learning his native language or a person learning a foreign language (especially in automatic teaching or self-teaching machines as well as for other audio-visual education methods); improving the human retention of information read—it is well known that material both read and heard is better remembered than either alone; providing flexibility in the utilization of the records to make them usable by blind persons, or listened to when a person's eyes are tired, or while performing any task requiring visual attention such as automobile driving; providing records of direction to be outputted from a machine in either form as appropriate to specific sets of conditions; or, in general, providing greater flexibility in the processes of communication between the human and the machine, between the human and recorded stores of information, and between the machine and recorded stores of information.

In addition, when more than two channels of information are available, they may be utilized to provide alternative pronunciations, alternative spellings, or transliteration, or, in certain cases, foreign language representations. This would be especially useful in promoting spelling and pronunciation reform by permitting present generations to utilize present spellings or pronunciations while new generations could be learning to utilize more efficient spellings and pronunciations.

Another application permits the definitions of unfamiliar words to be stored (in more dense form) in the same location as the word so that it is available upon request. Similarly, explanations, details, footnote references, are available. Also, cryptographic applications are obvious.

By use of the optical techniques described earlier for avoiding the confusion of overlapping edit marks and printing, two or more simultaneous visual channels are printed on a record to permit the alternative spellings or transliterations mentioned above each to be selectively available for visual reading, printing, or display.

However, it is, of course, not necessary for information to be sensed or recorded by optical techniques, in order to be able to present it visually. Thus, information invisibly recorded by deformation in a thermoplastic medium may be in a form that is read out optically for relatively direct visual presentation or may be scan patterns of information that are read out by an electron beam and which must be converted to an image from to be visually presented.

It should be noted that if required for any particular area of application of the invention, appropriate prior art techniques may be utilized to control the point or points of reading of the particular automatic signal reader embodiment used. For example, for operation with an encoded bar machine reader system, fiber optics edit signal reader elements may be integrated into a single head with the reading elements for the encoded bar, as discussed earlier. In such a case, the alignment and positioning provisions of the encoded bar machine reader system are utilized; and thus, no additional provisions are required in the edit signal reader. As another example, for reading one or more species of signals on a multi-mode storage record, an alignment signal channel may be included, and prior art methods of tracking such a signal may be utilized.

There has thus been disclosed a number of examples of the apparatus and utilization of a novel, automatic signal reader which may be employed in combination with a system, among others, for automatically editing records and documents and the like.

What is claimed is:

1. An electrical-optical signal reader for determining the presence and identity of character and edit signal marks in at least one space on a record medium, the reader being characterized in that light energy emanating from each of said edit signal marks has at least one fluorescent wavelength distribution selected from $n$ predetermined distributions where $n$ is any integer including one, said signal reader comprising: an illumination system for providing light to said space; at least one wavelength distribution distinguishing network said network including at least $n$ fluorescent wavelength distribution identifying means; at least one light energy spectrum band separator optically coupled to said wave-length distribution identifying means emanating light receiving means for coupling light emanating from said space to said light energy spectrum band separator; and at least one signal pattern analyzing means coupled to the outputs of said wavelength distribution identifying means for recognizing patterns of said edit marks.

2. An electrical-optical signal reader for determining the presence and identity of character and edit signal marks in at least one space on a record medium, light energy emanating from each of said edit signal marks having at lesat one fluorescent wavelength distribution selected from $n$ predetermined distributions where $n$ is any integer including one, said signal reader comprising: an illumination system for providing light to said space; at least one wavelength distribution distinguishing network said network including at least $n$ fluorescent wavelength distribution identifying means which each comprise a filter and photodetector for passing and detecting the presence of fluorescent light energy emanating from the signal marks and having at least a specific one of said predetermined number $n$ of wavelength distributions; at least one light energy spectrum band separator optically coupled to said wavelength distribution identifying means; emanating light receiving means for coupling light emanating from said space to said light energy spectrum band separator; and at least one signal pattern analyzing means coupled to the outputs of said wavelength distribution identifying means for recognizing patterns of said edit marks.

3. An electrical-optical signal reader for determining the presence and identity of character and edit signal marks in at least one space on a record medium, light energy emanating from each of said edit signal marks having at least one fluorescent wavelength distribution selected from $n$ predetermined distributions where $n$ is any integer including one, said signal reader comprising: an illumination system for providing light to said space, said light having reduced energy in all of the said $n$ predetermined wavelength distributions; a first fiber optics network of bundles for coupling light from said illumination system to at least a particular one at a given instant of time of said space; at least one wavelength distribution distinguishing network said network including at least $n$ fluorescent wavelength distribution identifying means which each comprise a filter and a photo-detector for passing and detecting the presence of light energy emanating from spaces containing said signal marks, said light energy having at least one of the said predetermined number $n$ of wavelength distributions; at least one light energy spectrum band separator optically coupled to said wavelength distribution identifying means; emanating light receiving means including a second fiber optics network for coupling light emanating from said space to said light energy spectrum band separator; a composite signal reading head for supporting the records space ends of said first and second networks of bundles of fiber optics, and for positioning said ends to be optically contiguous to the said space; and at least one signal pattern analyzing means, coupled to the outputs of said wavelength distribution identifying means for recognizing patterns of said edit marks.

4. An electrical-optical signal reader for determining the presence and identity of character and edit signal marks in at least one space on a record medium, light energy emanating from each of said edit marks having at least one wavelength distribution selected from $n$ predetermined distribution where $n$ is any integer including one, said signal reader comprising: an illumination system for providing light to said space; at least one wavelength distribution distinguishing network said network including at least $n$ wavelength distribution identifying means which each comprise an in-band wavelength distribution pass filter, a complementary wavelength distribution pass filter, and at least one photo-detector; emanating light receiving means for coupling light emanating from said space to said wavelength distribution identifying means; and at least one signal pattern analyzing means, coupled to the outputs of said wavelength distribution idenitfying means for recognizing patterns of said edit marks.

5. An electrical-optical signal reader system for determining the color and location of signal marks within a space of a possible matrix of spaces on a message medium, there being a first predetermined number, including one, of possible colors and a second predetermined number, including one, of possible matrix spaces, the system comprising: an illuminating system for directing light upon the matrix spaces, at least one color distinguishing network said network including a number, equal to at least the logarithm to the base two of said first predetermined number, of color identifying means which each comprise an in-band color pass filter, a complementary color pass filter, at least one photo-detector, and an electrical signal ratio divider means coupled to said photo-detector to determine the relative intensities of light incident upon said in-band bass filter and that incident upon said complementary pass filter; emanating light receiving means for coupling emanating light from said matrix spaces to each of said filters of each of said color distinguishing network; and at least one signal pattern analyzing means, coupled to the outputs of said color identifying means for recognizing patterns of said signal marks.

6. An electrical-optical signal reader for determining the presence and identity of signal marks in at least one space on a record medium, light energy emanating from each of said signal marks having at least one wavelength distribution selected from $n$ predetermined distributions, where $n$ is any integer including one, said signal reader comprising: an illumination system for providing light to said space; at least one wavelength distribution distinguishing network said network including $n$ wavelength distribution identifying means which each comprise an in-band wavelength distribution pass filter, a complementary wavelength distribution pass filter, at least one photo-detector, and an electrical signal difference network coupled to said photo-detector to determine the relative intensities of light incident upon said in-band pass filter and that incident upon said complementary pass filter; emanating light receiving means for coupling light emanating from said space to said wavelength distribution identifying means; and at least one signal pattern analyzing means, coupled to the outputs of said wavelength distribution identifying means for recognizing patterns of said signal marks.

7. An electrical-optical signal reader system for determining the color and location of a signal mark within a space of a possible matrix of spaces on a message medium, there being a first predetermined number, including one, of possible colors and a second predetermined number, including one, of possible matrix spaces, the system comprising: an illuminating system for directing light upon the matrix spaces; at least one color distinguishing network said network including a number, equal to at least the logarithm to the base two of said first predetermined number, of color identifying means which each comprise an in-band color pass filter, a complementary color pass filter, at least one photo-detector, and an electrical signal amplitude comparison means coupled to said photo-detector to determine the relative intensities of light incident upon said in-band pass filter and that incident upon said complementary pass filter; emanating light receiving means including a light energy spectrum band separator for coupling emanating light from said matrix spaces to each of said filters of said color distinguishing network; and at least one signal pattern analyzing means, coupled to the outputs of said color identifying means for recognizing patterns of said signal marks.

8. An electrical-optical signal reader for determining the presence and identity of signal marks in at least one space on a record medium, light energy emanating from each of said signal marks having at least one wavelength distribution selected from $n$ distributions where $n$ is any integer including one, said signal reader comprising: an illumination system for providing light to said space; a first fiber optics network of bundles for coupling light from said illumination system to at least a particular one, at a given instant of time, of said space; at least one wavelength distribution distinguishing network said network including $n$ wavelength distribution identifying means which each comprise: an in-band wavelength distribution pass filter, a complementary wavelength distribution pass filter, at least one photo-detector, and an electrical signal amplitude comparison means coupled to said photo-detector to determine the relative intensities of light incident upon said in-band pass filter and that incident upon said complementary pass filter; at least one light energy spectrum band separator optically coupled to said wavelength distribution identifying means; emanating light receiving means including a second fiber optics network for coupling light emanating from said space to said light energy spectrum band separators; a composite signal reading head for supporting the records space ends of said first and second networks of bundles of fiber optics, and for positioning said ends to be optically contiguous to the said space; and at least one signal pattern analyzing means, coupled to the outputs of said wavelength distribution identifying means for recognizing patterns of said signal marks.

9. An electrical-optical signal reader to detect light energy emanating from a medium having thereon a plurality of matrix spaces and to distinguish the wavelength distribution, from a predetermined number of wavelength distributions of the light emanating from said matrix spaces, said system comprising: an illuminator for illuminating said matrix spaces with light energy; a plurality of color distinguishing networks each associated at a given time with a particular one of said matrix spaces and including a number equal to at least the logarithm to the base two of said predetermined number of wavelength sensitive photo-detector means of the kind which provides an electrical output signal the magnitude of which is directly related to the intensity of a predetermined wavelength distribution of light energy incident upon said detector means; light receiving means for coupling the light energy emanating from each of said matrix spaces to its associated color distinguishing network and including a light energy dividing means for distributing the light emanating from each of said matrix spaces to said wavelength sensitive photo-detector means; and electrical signal amplitude comparison means coupled to each said detector means for determining the relative magnitude of intensity of particular wavelength distributions of light energy in said emanating light.

10. An electrical-optical signal reader to detect light energy emanating from a medium having thereon a matrix space and to distinguish the wavelength distribution, from a predetermined number of wavelength distributions of the light emanating from said matrix space, said system comprising: an illuminator for illuminating said matrix space with light energy; a color distinguishing network associated at a given time with said matrix space and including a number equal to at least the logarithm to the base two of said predetermined number of wavelength sensitive photo-detector means of the kind which provides an electrical output signal the magnitude of which is directly related to the intensity of a predetermined wavelength distribution of light energy incident upon said detector means; light receiving means for coupling the light energy emanating from said matrix space to said associated color distinguishing network and including a light energy dividing means for distributing the light emanating from said space to said wavelength sensitive photo-detector means; and electrical signal amplitude comparison means coupled to each said detector means for determining the relative magnitude of intensity of particular wavelength distributions of light energy in said emanating light.

References Cited

UNITED STATES PATENTS

| | | | |
|---|---|---|---|
| 2,834,005 | 5/1958 | Ketchledge | 340—173 |
| 2,961,649 | 11/1960 | Eldredge et al. | 340—146.3 |
| 3,058,093 | 10/1962 | Vernon et al. | 340—146.3 |
| 3,099,820 | 7/1963 | Ketchledge | 340—173 |
| 3,112,360 | 11/1963 | Gregg | 340—146.3 |
| 3,148,355 | 9/1964 | Sliter | 340—173 |

MAYNARD R. WILBUR, *Primary Examiner.*

J. SHERIDAN, *Assistant Examiner.*

U.S. Cl. X.R.

340—173